United States Patent
Yao

(10) Patent No.: US 9,618,109 B2
(45) Date of Patent: Apr. 11, 2017

(54) TURBO TRANSMISSION MECHANISM FOR BRUSH CUTTER

(71) Applicant: JYEN HERR ENTERPRISE CO., LTD., Changhua, Changhua (TW)

(72) Inventor: Kevin Yao, Changhua (TW)

(73) Assignee: JYEN HERR ENTERPRISE CO., LTD., Changhua, Changhua (TW)

( * ) Notice: Subject to any disclaimer, the term of this patent is extended or adjusted under 35 U.S.C. 154(b) by 223 days.

(21) Appl. No.: 14/520,744

(22) Filed: Oct. 22, 2014

(65) Prior Publication Data

US 2015/0362062 A1 Dec. 17, 2015

(30) Foreign Application Priority Data

Jun. 13, 2014 (TW) .............................. 103120598 A

(51) Int. Cl.
| | |
|---|---|
| *F16H 57/04* | (2010.01) |
| *A01D 34/90* | (2006.01) |
| *F16H 1/12* | (2006.01) |
| *F16H 57/00* | (2012.01) |

(52) U.S. Cl.
CPC ......... *F16H 57/0495* (2013.01); *A01D 34/90* (2013.01); *F16H 57/0025* (2013.01); *F16H 57/0409* (2013.01); *Y10T 74/19665* (2015.01)

(58) Field of Classification Search
CPC .. F16H 57/0495; F16H 57/0409; F16H 1/125; F16H 1/12; A01D 34/90
See application file for complete search history.

(56) References Cited

U.S. PATENT DOCUMENTS

| | | | | |
|---|---|---|---|---|
| 2004/0143974 | A1* | 7/2004 | Giovanardi | A01D 34/90 30/276 |
| 2005/0000095 | A1* | 1/2005 | Warashina | A01D 34/90 30/276 |
| 2006/0083636 | A1* | 4/2006 | King | B26D 7/00 417/410.1 |
| 2011/0083328 | A1* | 4/2011 | Miyahara | A01D 34/90 30/276 |
| 2013/0247386 | A1* | 9/2013 | Ishikawa | A01D 34/902 30/296.1 |
| 2015/0013172 | A1* | 1/2015 | Shaffer | H02K 5/08 30/276 |

* cited by examiner

*Primary Examiner* — Terence Boes
(74) *Attorney, Agent, or Firm* — Muncy, Geissler, Olds & Lowe, P.C.

(57) ABSTRACT

A turbo transmission mechanism for brush cutter is disclosed to include a casing defining therein a lubricant storage chamber, a transmission shaft rotatably mounted in the casing and partially inserted into the lubricant storage chamber, a transmission gear set mounted in the lubricant storage chamber of the casing and including a first bevel gear and a second bevel gear coaxially mounted at the transmission shaft and meshed with the first bevel gear for enabling the transmission shaft to be rotated by the second bevel gear during rotation of the first bevel gear by a power source, and a turbo mounted in the lubricant storage chamber and rotatable with the transmission shaft to stir up the lubricant in the lubricant storage chamber, enhancing heat dissipation.

11 Claims, 5 Drawing Sheets

TURBO TRANSMISSION MECHANISM FOR BRUSH CUTTER

BACKGROUND OF THE INVENTION

1. Field of the Invention

The present invention relates to lawn mower technology and more particularly, to a turbo transmission mechanism for use in a brush cutter.

2. Description of the Related Art

Lawn mowers can be generally divided into pushcart type and shoulder type. Both the pushcart type and the shoulder type have their advantages and disadvantages. For example, a pushcart type lawn mower has the advantage of labor-saving and the disadvantages of limited moving range and high cost; a shoulder type lawn mower also called brush cutterwhich has the advantages of high mobility and low manufacturing cost and the disadvantage of laborious operation.

A brush cutter uses a transmission mechanism to transfer the power from the engine to a revolving cutter, rotating the revolving cutter at a high speed to cut the lawn. In order to increase the transmission efficiency during power transmission, the conventional method is to add a suitable amount of lubricant to the transmission mechanism, on the one hand, enabling the lubricant to provide a lubrication effect, and on the other hand, causing the flowing lubricant to carry heat away from the transmission mechanism. However, in actual operation, the flowability of the applied lubricant is not satisfactory, unable to achieve the expected heat dissipation effects. Thus, under a long-term use, the lubricant will certainly affect the lifespan of the whole structure of the transmission mechanism.

SUMMARY OF THE INVENTION

The present invention has been accomplished under the circumstances in view. It is the main object of the present invention to provide a turbo transmission mechanism for brush cutter, which has excellent cooling effects to extend the lifespan.

To achieve this and other objects of the present invention, a turbo transmission mechanism comprises a casing comprising a lubricant storage chamber; a transmission shaft rotatably mounted in the casing, comprising a first transmission segment disposed outside the lubricant storage chamber of the casing and a second transmission segment disposed inside the lubricant storage chamber of the casing; a transmission gear set mounted in the lubricant storage chamber of the casing, comprising a first bevel gear and a second bevel gear coaxially mounted at the second transmission segment of the transmission shaft and meshed with the first bevel gear; and a turbo disposed in the lubricant storage chamber of the casing and coaxially mounted at the second transmission segment of the transmission shaft.

Thus, when the first bevel gear is driven by a power source to rotate the second bevel gear, the second bevel gear will rotate the transmission shaft, causing the transmission shaft, on the one hand, to rotate the mowing disk in cutting the lawn, on the other hand, to rotate the turbo in stirring up the lubricant in the lubricant storage chamber to produce a heat dissipation effect.

Preferably, the turbo comprises a plurality of spoiler wing portions located at the periphery thereof and spirally extending around the axis of the transmission shaft to enhance the effect of stirring up the lubricant.

Preferably, the turbo comprises a plurality of spoiler slots located at the periphery thereof and spirally extending around the axis of the transmission shaft to enhance the effect of stirring up the lubricant.

Further, the turbo can be detachably attached to the second transmission segment of the transmission shaft. Alternatively, the turbo can be formed integral with the second transmission segment of the transmission shaft.

Other advantages and features of the present invention will be fully understood by reference to the following specification in conjunction with the accompanying drawings, in which like reference signs denote like components of structure.

DETAILED DESCRIPTION OF THE INVENTION

Figure 1:
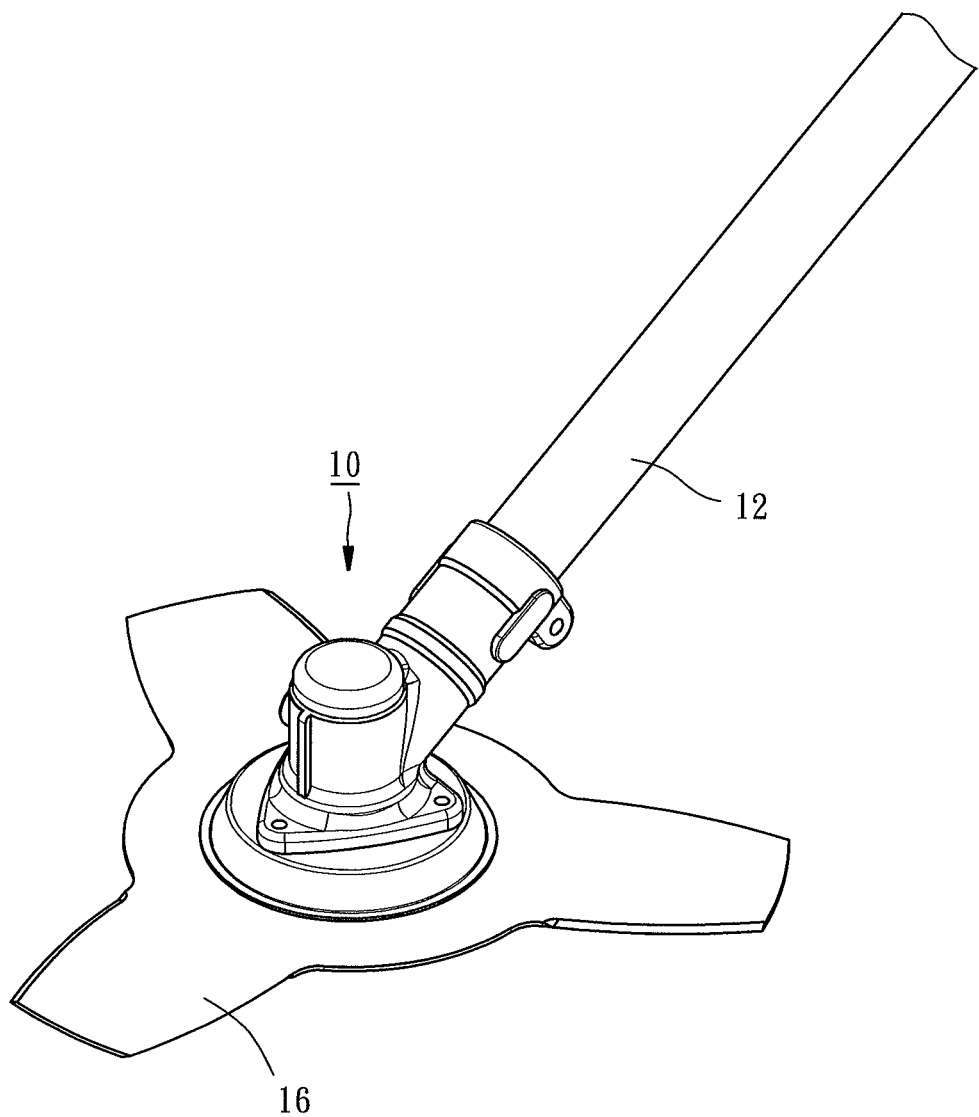
FIG. 1 is an elevational view of a turbo transmission mechanism in accordance with a first embodiment of the present invention.
Figure 2:
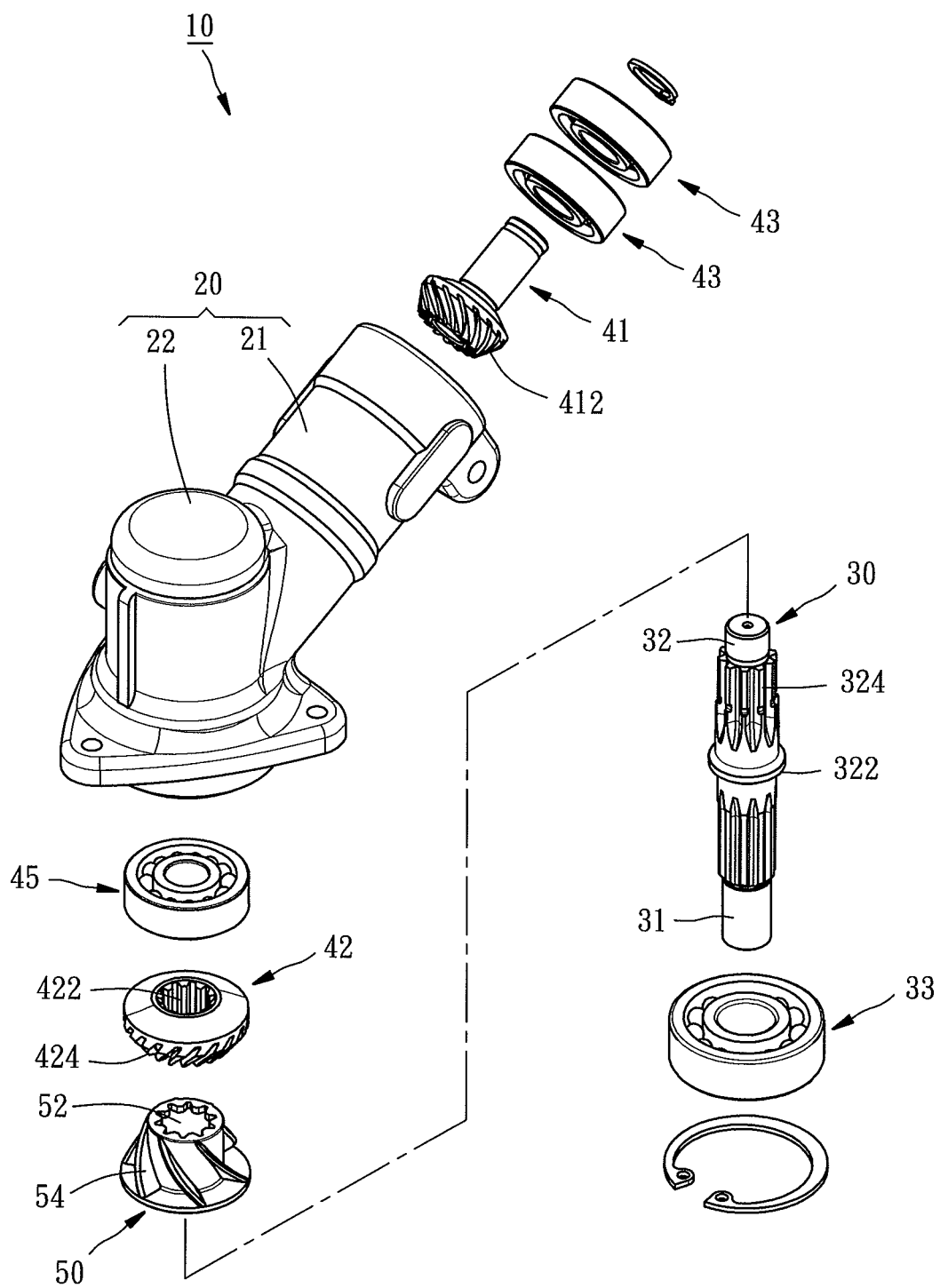
FIG. 2 is an exploded view of the turbo transmission mechanism in accordance with the first embodiment of the present invention.
Figure 3:
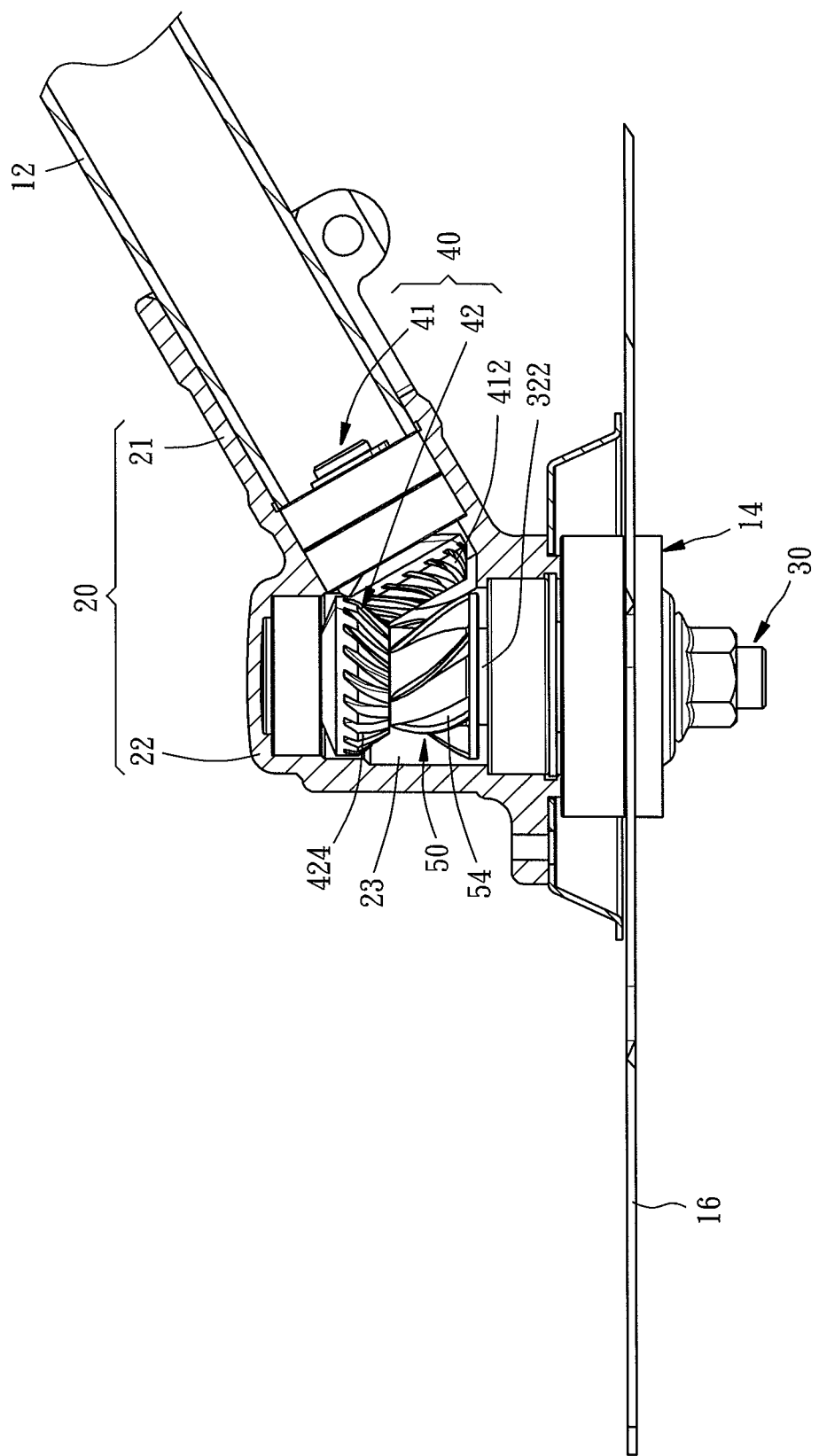
FIG. 3 is a sectional view of the turbo transmission mechanism in accordance with the first embodiment of the present invention.

Referring to FIGS. 1-3, a turbo transmission mechanism 10 used in a brush cutter in accordance with a first embodiment of the present invention is shown. The turbo transmission mechanism 10 comprises a casing 20, a transmission shaft 30, a transmission gear set 40, and a turbo 50.

The casing 20 comprises a first mounting portion 21 and a second mounting portion 22. The first mounting portion 21 has one end thereof adapted for receiving a coupling tube 12 of the brush cutter, and an opposite end thereof obliquely connected to the second mounting portion 22 in such a manner that a lubricant storage chamber 23 (see FIG. 3) is defined within the first mounting portion 21 and the second mounting portion 22 for storing a lubricant.

As illustrated in FIG. 2 and FIG. 3, the transmission shaft 30 is rotatably mounted in the second mounting portion 22 of the casing 20 by a bearing 33, comprising a first transmission segment 31 disposed outside the lubricant storage chamber 23 for the connection of a cutter holder 14 (see FIG. 3), a second transmission segment 32 disposed inside the lubricant storage chamber 23, a shoulder 322 extending around the periphery of the second transmission segment 32 and an annular tooth portion 324 extending around the periphery of the second transmission segment 32 and disposed adjacent to the shoulder 322.

The transmission gear set 40 is mounted inside the lubricant storage chamber 23, comprising a first bevel gear 41 and a second bevel gear 42. The first bevel gear 41 is rotatably mounted in the first mounting portion 21 of the casing 20 by two abutted bearings 43 for the connection of a flexible drive shaft (not shown) of the brush cutter. The second bevel gear 42 is rotatably mounted in the second mounting portion 22 of the casing 20 by a bearing 45 that is secured to the casing 20 by a C-shaped retainer ring 46. Further, the second bevel gear 42 comprises a first toothed hole 422 meshed with the annular tooth portion 324 at the second transmission segment 32 of the transmission shaft 30 for enabling the second bevel gear 42 to be synchronously rotated with the transmission shaft 30. Further, the first bevel gear 41 comprises a first spiral bevel gear portion 412. The second bevel gear 42 comprises a second spiral bevel gear portion 424 meshed with the first spiral bevel gear portion 412 of the first bevel gear 41, as illustrated in FIG. 3.

In this embodiment, the turbo 50 comprises a second toothed hole 52 attached onto the annular tooth portion 324 of the second transmission segment 32 of the transmission shaft 30 in the lubricant storage chamber 23 for synchronous rotation with the transmission shaft 30 and stopped between the second transmission segment 32 of the transmission shaft 30 and the second bevel gear 42 to enhance operational stability. Further, the turbo 50 has spoiler wing portions 54 located around the periphery thereof and spirally extending around the axis of the transmission shaft 30.

From the above-described structure, it can be seen that when the engine is started, the engine will drive the flexible drive shaft to rotate the first bevel gear 41 and then the second bevel gear 42, causing the second bevel gear 42 to rotate the transmission shaft 30. During rotation of the transmission shaft 30, the transmission shaft 30 will, on the one hand, drive the cutter holder 14 in moving revolving blades 16 to cut the lawn, and on the other hand, drive the turbo 50 to rotate, causing the spoiler wing portions 54 of the turbo 50 to stir up the lubricant in the lubricant storage chamber 23 for quick cooling. However, in order to enhance the effects of the turbo 50 in stirring up the lubricant, the extending direction of the spoiler wing portions 54 of the turbo 50 is preferably in reverse to the extending direction of the second spiral bevel gear portion 424 of the second bevel gear 42.

Figure 4:
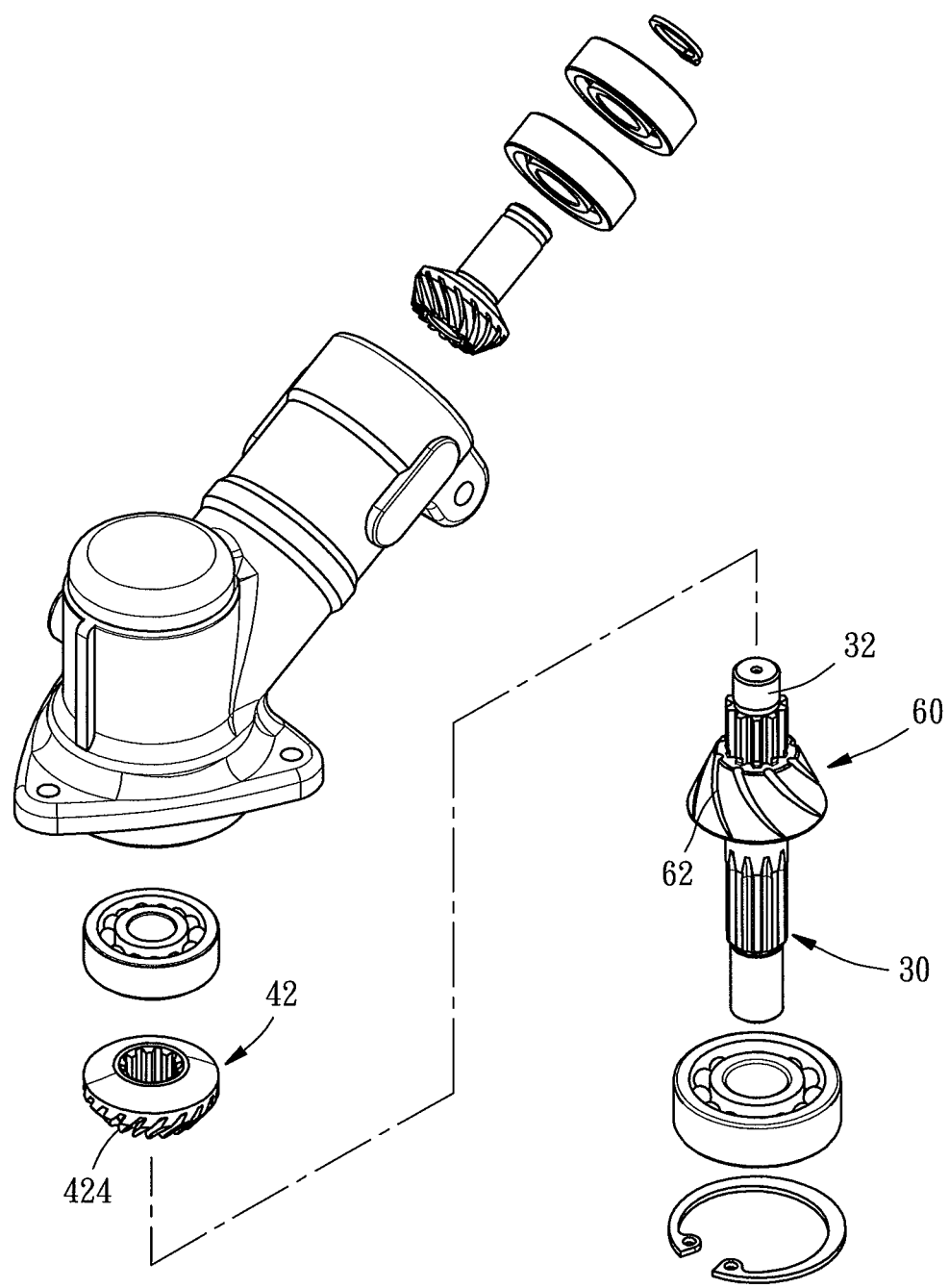
FIG. 4 is an exploded view of a turbo transmission mechanism in accordance with a second embodiment of the present invention.
Figure 5:
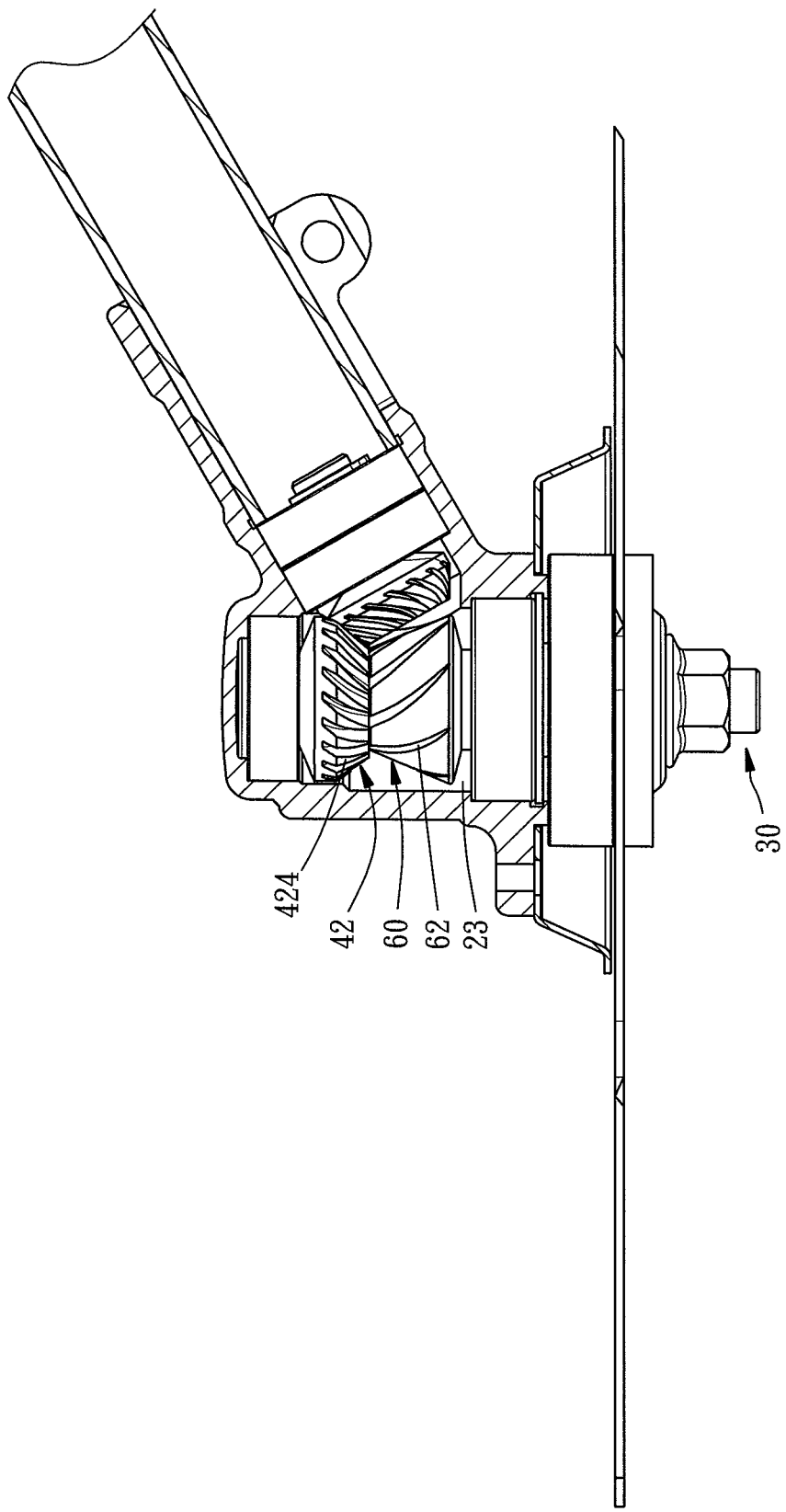
FIG. 5 is a sectional view of the turbo transmission mechanism in accordance with the second embodiment of the present invention.

Referring to FIG. 4 and FIG. 5, in a second embodiment of the present invention, the turbo, referenced by 60, is formed integral with the second transmission segment 32 of the transmission shaft 30, comprising a plurality of spoiler slots 62 located in the periphery thereof and spirally extending around the axis of the transmission shaft 30. Preferably, the extending direction of the spoiler slots 62 is in reverse to the extending direction of the second spiral bevel gear portion 424 of the second bevel gear 42. Thus, during rotation of the transmission shaft 30, the spoiler slots 62 of the turbo 60 can stir up the lubricant in the lubricant storage chamber 23, achieving the same lubricant cooling effects.

In conclusion, the turbo transmission mechanism 10 of the invention uses the turbo 50;60 to stir up the lubricant, on the one hand, providing sufficient lubrication to increase the transmission efficiency, on the other hand, producing a heat dissipation effect during flowing of the lubrication to further prolong the lifespan of the whole structure.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A turbo transmission mechanism for use in a brush cutter, comprising:
    a casing comprising a lubricant storage chamber;
    a transmission shaft rotatably mounted in said casing, said transmission shaft comprising a first transmission segment disposed outside said lubricant storage chamber of said casing and a second transmission segment disposed inside said lubricant storage chamber of said casing;
    a transmission gear set mounted in said lubricant storage chamber of said casing, said transmission gear set comprising a first bevel gear and a second bevel gear, said second bevel gear being coaxially mounted at said second transmission segment of said transmission shaft and meshed with said first bevel gear; and
    a turbo disposed in said lubricant storage chamber of said casing and coaxially mounted at said second transmission segment of said transmission shaft.

2. The turbo transmission mechanism as claimed in claim 1, wherein said turbo comprises a plurality of spoiler wing portions located around the periphery thereof and spirally extending around the axis of said transmission shaft.

3. The turbo transmission mechanism as claimed in claim 2, wherein said first bevel gear comprises a first spiral bevel gear portion; said second bevel gear comprises a second spiral bevel gear portion meshed with said first spiral bevel gear portion of said first bevel gear, the extending direction of said second spiral bevel gear portion being in reverse to the extending direction of said spoiler wing portions of said turbo.

4. The turbo transmission mechanism as claimed in claim 2, wherein said transmission shaft further comprises an annular tooth portion extending around the periphery of said second transmission segment; said turbo comprises a toothed hole attached onto said annular tooth portion at said second transmission segment of said transmission shaft.

5. The turbo transmission mechanism as claimed in claim 4, wherein said transmission shaft further comprises a shoulder extending around the periphery of said second transmission segment and disposed adjacent to said annular tooth portion; said turbo is stopped between said shoulder and said second bevel gear.

6. The turbo transmission mechanism as claimed in claim 3, wherein said transmission shaft further comprises an annular tooth portion extending around the periphery of said second transmission segment; said turbo comprises a toothed hole attached onto said annular tooth portion at said second transmission segment of said transmission shaft.

7. The turbo transmission mechanism as claimed in claim 6, wherein said transmission shaft further comprises a shoulder extending around the periphery of said second transmission segment and disposed adjacent to said annular tooth portion; said turbo is stopped between said shoulder and said second bevel gear.

8. The turbo transmission mechanism as claimed in claim 1, wherein said turbo comprises a plurality of spoiler slots located at the periphery thereof and spirally extending around the axis of said transmission shaft.

9. The turbo transmission mechanism as claimed in claim 8, wherein said turbo is formed integral with said second transmission segment of said transmission shaft and abutted with one end thereof against said second bevel gear.

10. The turbo transmission mechanism as claimed in claim 8 wherein said first bevel gear comprises a first spiral bevel gear portion; said second bevel gear comprises a second spiral bevel gear portion meshed with said first spiral bevel gear portion of said first bevel gear, the extending direction of said second spiral bevel gear portion being in reversed to the extending direction of said spoiler slots of said turbo.

11. The turbo transmission mechanism as claimed in claim 10, wherein said turbo is formed integral with said second transmission segment of said transmission shaft and abutted with one end thereof against said second bevel gear.

* * * * *